3,480,804
METHOD AND APPARATUS FOR LIQUID MHD GENERATOR SYSTEMS
Donald L. Tipton, Speedway, Ind., assignor to General Motors Corporation, Detroit, Mich., a corporation of Delaware
Filed July 25, 1966, Ser. No. 567,571
Int. Cl. H02k *45/00;* H02n *4/02*
U.S. Cl. 310—11          14 Claims

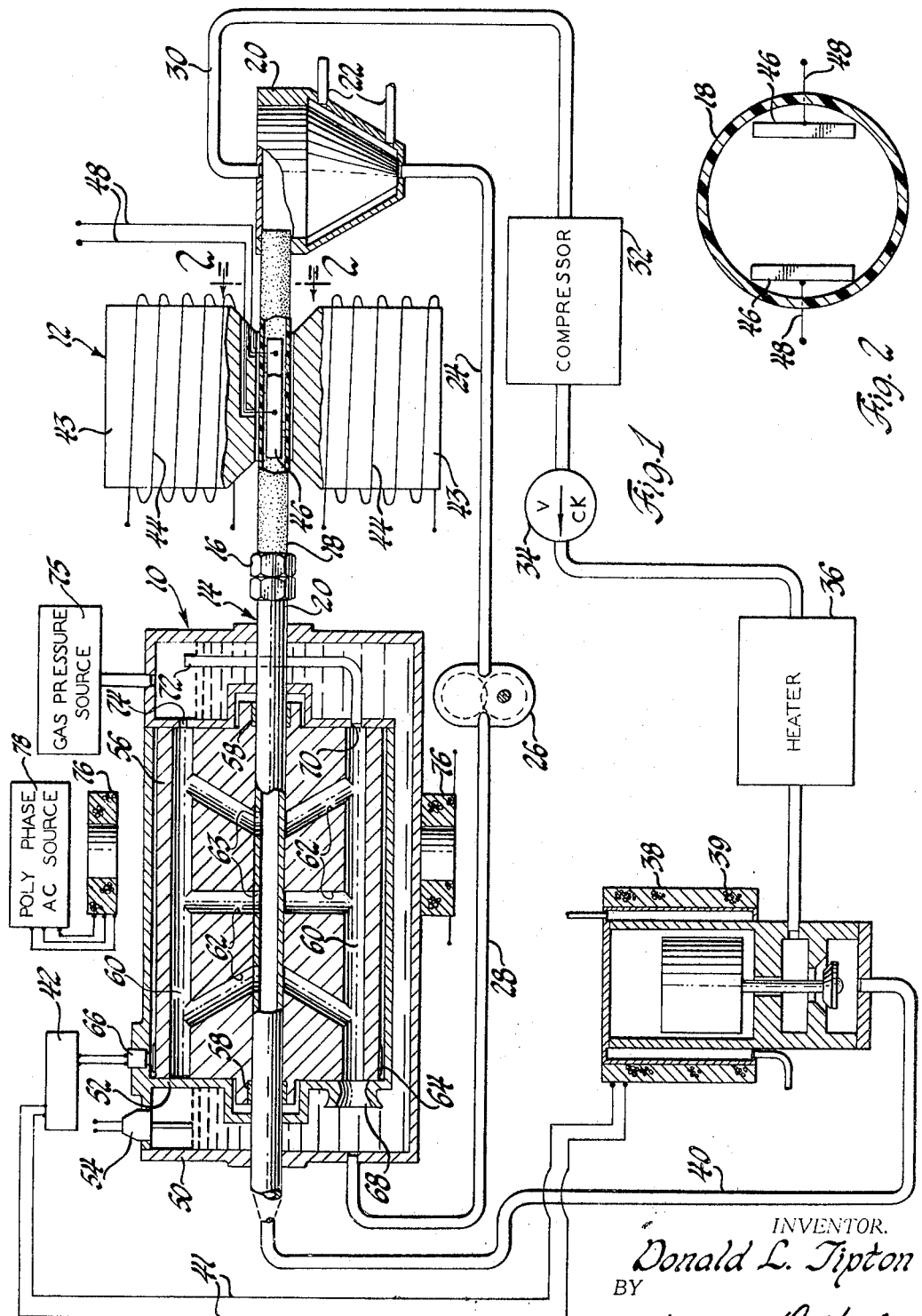
Nov. 25, 1969 — D. L. TIPTON — 3,480,804
METHOD AND APPARATUS FOR LIQUID MHD GENERATOR SYSTEMS
Filed July 25, 1966
INVENTOR.
Donald L. Tipton
BY
Warren D. Hill
ATTORNEY United States Patent Office 3,480,804
Patented Nov. 25, 1969

ABSTRACT OF THE DISCLOSURE

A rotating cylinder feeds slugs of liquid metal to the working fluid duct of an MHD generator where pulses of pressurized gas propel the liquid slugs through the generator in rapid succession.

---

This invention relates to magnetohydrodynamic (MHD) generator systems, and more particularly to a liquid MHD generator system and a method of supplying liquid to an MHD generator.

MHD generators have commonly utilized conductive gases as working fluids, although it has been recognized that conductive liquids such as liquid metals would be advantageous as working fluids because of their extremely large electrical conductivity in comparision with gaseous working fluids. In the use of liquids, however, a problem has existed in attempting to impart sufficient kinetic energy to the liquid. A known method of imparting this energy is by the use of an ejector-condenser with either a gaseous or vaporous driving fluid. The basic problem with that method is the excessive inefficiency of the momentum transfer process.

It is therefore an object of this invention to provide an improved MHD generator system utilizing liquid working fluids.

It is another object of this invention to provide means for efficiently imparting kinetic energy to a liquid working fluid in an MHD generator.

A further object is to provide a means for supplying slugs of liquid to a working fluid duct of an MHD generator and to propel the slugs through the duct.

Still another object is to provide a method of supplying high kinetic energy slugs of liquid to an MHD generator.

This invention is carried out by creating a trapped pool of liquid in the working fluid duct of an MHD generator with a free surface which is subjected to a pulsed surge of gas or vapor. The invention provides means for rapid repetition of this action whereby repetitive pulses of current are developed by the MHD generator.

This invention is further carried out by providing means for injecting slugs of liquid into the working fluid duct of an MHD generator system incorporating a rotating feeder carrying several slugs of liquid, means for rapidly injecting the slugs into a duct, and means for propelling the slugs through the duct.

The invention is also carried out by providing a method including forming slugs of liquid, injecting the slugs into an MHD generator working fluid duct and propelling the slugs through the duct by bursts of gas or vapor.

The above and other advantages will be more apparent from the following description and the accompanying drawings wherein like reference numerals refer to like parts, and wherein:

FIGURE 1 is a schematic representation of a liquid MHD generator system according to the invention; and FIGURE 2 is an enlarged cross sectional view taken along lines 2—2 of FIGURE 2.

A preferred embodiment of the invention as illustrated in the drawings is an MHD generator system including apparatus and method for forming a measured amount of conductive liquid such as liquid metal and injecting it into the working fluid duct of an MHD generator to form a trapped pool or slug of liquid therein, applying a surge of gas or vapor to each slug of liquid to blow it through the magnetic field of the MHD generator and rapidly repeating this function in order to create repetitive pulses of current in the generator output.

FIGURE 1 of the drawing shows a feeding device 10 connected to an MHD generator 12 by a working fluid duct 14. A coupling 16 is provided to permit the portion 18 of the duct passing through the generator to be made of insulating material, while the portion 20 intimately associated with the feeding device 10 may comprise metal pipe if desired. The duct portion 18 terminates at a cooler-separator 20. A cooler-separator is a conventional item for separating gas from liquid and at the same time cooling the fluids by means of water circulating therethrough via conduits 22. A liquid carrying conduit 24 connects the bottom of the cooler-separator 20 to a pump 26, which in turn is connected by conduit 28 to the feeding device 10. A gas carrying conduit 30 is connected to the top of the cooler-separator and to a compressor 32, a check valve 34, a heater 36 and a solenoid control valve 38 in that order. The solenoid control valve in turn is connected by conduit 40 to the working fluid duct 14 at the feeding device 10. The coil 39 of solenoid control valve 38 is electrically connected by conductors 41 to a valve controller 42 adjacent the feeding device 10.

The MHD generator 12 includes an electromagnet comprising pole pieces 43 disposed on opposite sides of the duct 18 which are energized by windings 44 to thereby create a magnetic field across the duct. The windings 44 are connected to a source of direct current, not shown. A pair of electrodes 46, as best seen in FIGURE 2, are located within the duct 18 and within the magnetic field. Output terminals 48 lead from the electrodes 46 to a utilization circuit, not shown.

The feeding device 10 comprises a generally cylindrical housing 50 containing a generally cylindrical compartment 52 mounted to the top thereof. A space between the compartment 52 and the housing 50 defines a reservoir for a liquid working fluid which is supplied by pump 26. The working fluid may comprise any suitable conductive liquid such as liquid potassium, sodium or mercury. A liquid level detector 54 is mounted on the top of the housing 50 and has a probe extending into the reservoir down to the desired liquid level. By electrical means, not shown, the liquid level detector 54 controls the pump 26 to maintain the desired liquid level within the reservoir. The working fluid duct 14 extends entirely through the housing 50 and through the compartment 52. Within the compartment 52 a cylindrical feeder 56 having a bore along its central axis is journalled on the duct 20 by bearings 58 which are lubricated by the liquid working fluid. The longitudinal dimension of the feeder 56 is nearly the same as the dimension of the interior of the compartment 52 so that a controlled leakage-low friction seal is formed between the feeder 56 and the end walls of the compartment 52. Similarly, the central bore of the feeder 56 is only slightly larger than the duct portion 20 so that a similar controlled leakage-low friction seal is formed about the duct. The feeder 56 has a plurality of longitudinally extending bores or chambers 60 equally spaced near the periphery thereof. Six bores are preferred but any appropriate number may be selected. Each bore or chamber 60 is connected by three passageways 62 to the central bore of the feeder 56. The duct portion 20 has along its top wall, three apertures 63, each coinciding with the terminus of one of the passageways 62 of one of the chambers 60 so that a fluid flow path is defined from the uppermost chamber 60 through the passageways 62 and through the aperture 63 to the interior of the duct portion 20. Any chamber 60 not occupying the uppermost position will not be in communication with the interior of the duct portion 20 because of the sealing interface between the duct portion 20 and the central bore of the feeder 56. A series of metallic pips or teeth 64 are located around the periphery of the feeder 56 near the left end thereof. Each tooth 64 is located to correspond to the position of a bore or chamber 60 within the feeder. A magnetic pickup device 66 is located in the top of the housing 50 adjacent the path of the teeth 64. The pickup device 66 is electrically connected to the valve controller 42. Near the bottom of the compartment 52, at one end thereof, is an opening 68 in the compartment in line with the path of movement of the bores 60, and at the opposite end of the compartment is a vent hole 70 connected to a vent pipe 72 extending above the liquid level of the working fluid. Another opening 74 in the end of the compartment 52 is located above the liquid level in line with the uppermost point of the path of movement of the bores or chambers 60. A gas pressure source 75 is connected to the reservoir through the top of the housing 50.

The feeder 56 is caused to rotate by any desired means. In the embodiment as illustrated, the entire housing 50 is surrounded by a series of field coils 76 connected to a polyphase AC source 78. The series of coils is concentric with the axis of rotation of the feeder 56 so that the combination of the field coils and the feeder 56 comprise an induction motor with the feeder acting as the rotating armature. In this event, of course, the housing 50 and the compartment 52 must be made of nonconductive materials. Another way to achieve feeder rotation is to incorporate the feeder and the MHD generator into one unit and to utilize the Lorenz force to rotate the feeder. An alternative means of rotating the feeder 56 would be by taking advantage of the reactive forces of the liquid flowing within the feeder, for example, by utilizing curved passageways 62 so that as the liquid flows through the passageways, a moment will be imparted to the feeder 56.

The heater 36 may be a nuclear reactor or other heat source which will increase the enthalpy of the gas. The purpose of the heater then is to provide a means for enabling the MHD system to convert heat from a heat source to electrical energy.

In operation, the liquid working fluid within the housing 50 is maintained under pressure by the gas supplied to the reservoir from the gas pressure source 75. Liquid is supplied to the reservoir by pump 26, which pump is controlled by the liquid level detector 54. The feeder 56 is caused to rotate about the duct portion 20 by the field of the coils 76. As the feeder 56 rotates, the bores or chambers 60 successively pass the opening 68 in the wall in compartment 52. The fluid within the reservoir is then forced through the aperture 68 into each chamber 60. The vent 70 permits any gas entrapped in a chamber 60 to escape through the vent pipe 72, thereby allowing each chamber 60 to become filled with a predetermined amount of liquid. As each liquid filled chamber 60 reaches its uppermost position due to the rotation of feeder 56, its passageways 62 become aligned with the apertures 63 in the upper duct wall, and the liquid is discharged from the chamber 60 into the duct, where it forms a trapped pool or slug. This discharge is accomplished by gravity feed assisted by the pressurized gas which enters the uppermost chamber 60 through the opening 74. As each chamber 60 reaches its uppermost position and a fluid discharge to the duct portion 20 occurs, the pip or tooth 64 corresponding to that chamber passes the magnetic pickup 66, which sends a signal to the valve controller 42 which in turn energizes the coil 39 of solenoid control valve 38 causing the valve to open. Then a burst of gas is emitted through conduit 40 to the duct 14 to blow the slug of liquid through the duct and through the field of the MHD generator 12 to produce a pulse of current at the output terminals 48. The valve controller 42 is adjusted to maintain the solenoid control valve 38 open for only a short interval so that the gas pressure within the duct portion 20 may drop in preparation to receive another slug of liquid from the rotary feeder 56. The gas and liquid emitted from the duct 14 enters the cooler-separator 20 where the fluids are cooled and separated so that the liquid flows through the conduit 24 back to the pump 26 and the gas flows to the compressor 32 through the check valve 34, and into the heater 36, thereby providing a closed cycle.

In a typical system the temperature and pressure of the driving fluid as it is applied to the working fluid would be 2000° F. and 500 p.s.i. respectively, while the temperature and pressure of the working fluid in the feeder would be 1000° F. and 30 p.s.i. With these parameters, the velocity of the slug of working fluid passing through the MHD generator would be of the order of 200 feet per second.

It will be apparent that the frequency of the electrical output pulses at terminals 48 will depend upon the rate of rotation of the feeder 56 and the number of bores or chambers 60 within the feeder. For example, if the feeder 56 contained six chambers 60 and rotated at the rate of 10 revoltuions per second, then the output frequency of the system will be 60 pulses per second.

The driving fluid may comprise a vapor as well as a true gas. The vapor would constitute the same material used for the working fluid, i.e., if the working fluid is a liquid alkali metal, the driving fluid would be the vapor of the same metal. The term "gas" as used in the claims below is intended to embrace vapor.

The apparatus and method above described provides an improved MHD generator system using liquid working fluids and provides a means and a method for efficiently imparting kinetic energy to a liquid working fluid in an MHD generator. The description herein relates to the preferred embodiment of the invention and the scope of the invention is to be limited only by the following claims.

I claim:
1. In a liquid MHD generator system including a working fluid duct, means for providing a magnetic field across the duct, electrodes within the duct and within the magnetic field, means for injecting a succession of slugs of liquid into the duct, and means for propelling the liquid through the magnetic field at a high velocity including means for applying high pressure gas to each slug of liquid, the means for applying high pressure gas comprising a source of compressed gas, means for heating the gas to further increase its pressure, a conduit for carrying the compressed gas to the duct, and valve means in the conduit for emitting pulsed bursts of gas to the duct.

2. In a liquid MHD generator system as described in claim 1 wherein there is provided means for separating the gas from the liquid after passing through the magnetic field, and means for returning the gas to the source of compressed gas.

3. In a liquid MHD generator system including a working fluid duct, means for providing a magnetic field across the duct, electrodes within the duct and within the magnetic field, means for injecting a succession of slugs of liquid into the duct, and means for propelling the liquid through the magnetic field at a high velocity, wherein the means for injecting a succession of slugs of liquid into the duct comprises a reservoir containing liquid metal, means for maintaining the liquid within the reservoir under pressure, a feeder means rotatably mounted within the reservoir, means for rotating the feeder means, a plurality of chambers within the feeder means, means for selectively filling each chamber at one rotary position of the feeder means, and means for selectively connecting each chamber to the duct for discharging its contents of liquid into the duct at another rotary position of the feeder means.

4. In a liquid MHD generator system as described in claim 3 wherein the feeder means is concentric with the duct for rotation therearound, and means for selectively connecting each chamber to the duct includes passage means extending from each chamber to the duct and apertures in the duct in registry with the passage means of a chamber in said another rotary position.

5. In a liquid MHD generator system as described in claim 3 wherein the means for propelling the liquid through the magnetic field includes means for applying high pressure gas to the slug of liquid.

6. In a liquid MHD generator system as described in claim 5 wherein the means for applying high pressure gas to the slug of liquid includes a source of compressed gas, means for heating the gas to further increase its pressure, a conduit for carrying the compressed gas to the duct and valve means in the conduit for emitting pulsed bursts of gas to the duct.

7. In a liquid MHD generator system as described in claim 6 wherein the means for applying high pressure gas to the slug of liquid further includes means for detecting the said another rotary position of the feeder means and simultaneously controlling the valve means to thereby synchronize the pulsed bursts of gas with the discharge of the liquid into the duct.

8. Means for rapidly injecting a succession of slugs of liquid into an MHD generator duct comprising a liquid reservoir surrounding the duct, means for supplying liquid to the reservoir under pressure, feeder means rotatably mounted within the reservoir and surrounding the duct, means for rotating the feeder means, a plurality of chambers in the feeder means disposed around the duct, passage means extending from each chamber to the duct, means at one location relative to the duct for permitting liquid flow into each chamber selectively, and means at another location for effecting liquid flow selectively from each chamber through the passage means into the duct.

9. Means for rapidly injecting a succession of slugs of liquid into an MHD generator system as described in claim 8 wherein the means for effecting liquid flow from each chamber into the duct comprises aperture means in the duct for selectively registering with the passage means of each duct.

10. Means for rapidly injecting a succession of slugs of liquid into an MHD generator system, as described in claim 9 wherein the means for effecting liquid flow from each chamber into the duct further comprises means for admitting a gas under pressure to each chamber at said another location to force the liquid into the duct.

11. A method of supplying high kinetic energy slugs of liquid to an MHD generator having a working fluid duct comprising the steps of forming a plurality of slugs of liquid, sequentially injecting the slugs into the duct, and applying a burst of compressed gas to each slug to propel each slug through the duct.

12. A method of supplying high kinetic energy slugs or liquid to an MHD generator as described in claim 11 wherein the step of forming a plurality of slugs comprises filling a plurality of chambers with liquid.

13. A method of supplying high kinetic energy slugs of liquid to an MHD generator as described in claim 12 wherein the step of injecting the slugs comprises connecting the chambers to the duct sequentially and discharging the liquid from the chambers to the duct.

14. A method of supplying high kinetic energy slugs of liquid to an MHD generator as described in claim 13 wherein the step of filling a plurality of chambers with liquid comprises sequentially moving the chambers through a reservoir of liquid so that the liquid flows into the chambers.

References Cited
UNITED STATES PATENTS

| | | | |
|---|---|---|---|
| 2,362,283 | 11/1944 | McCollum | 310—11 |
| 3,294,898 | 12/1966 | Eichenberger | 310—11 |
| 3,320,444 | 5/1967 | Prem | 310—11 |
| 3,399,315 | 8/1968 | Powell | 310—11 |

DAVID X. SLINEY, Primary Examiner